United States Patent Office 2,769,716
Patented Nov. 6, 1956

2,769,716
FUNGISTATIC PIGMENT AND COATING COMPOSITION

James J. Rankin, Beaver, Pa., assignor to St. Joseph Lead Company, New York, N. Y., a corporation of New York No Drawing. Application January 16, 1953,
Serial No. 331,748

12 Claims. (Cl. 106—15)

This invention relates to pigments or extender pigments treated to inhibit the development and growth of fungus, mold, mildew, smuts or the like, for use in the manufacture of protective coatings, linoleum, rubber products, leather, textiles, drugs, and the like having fungistatic properties and to coating compositions containing the same.

It is an object of the invention to provide fungus inhibiting pigments or extender pigments, and coating compositions containing the same.

Another object of the invention is the provision of a fungistatic pigment composition which will not materially affect the durability or the color of the coating composition in which it is incorporated.

A further object is the provision of a fungus inhibiting agent that has pigmentary properties of substantial value, that is, inexpensive, and that is not highly toxic.

It is a further object of the invention to incorporate into or coat the particles of zinc oxide pigments with predetermined amounts of an oxyhalide of zinc, particularly zinc oxychloride and oxyfluoride or any combination of the two, by reacting a large excess of the pigment with a halogen or halogen compounds to improve the fungistatic property of the zinc oxide pigment without materially affecting its pigmentary properties.

In the protective coating industry it is well known that paints, lacquers, and similar coating compositions having drying oils, resins, or other organic binders incorporated in the coating composition, are ready hosts for many types of fungi and molds. The susceptibility of these protective coatings to attack is particularly enhanced when such coatings are exposed to damp warm atmospheres. Growths of micro-organisms are not only detrimental to the life of protective coatings, but they also greatly decrease their aesthetic appearance by their discoloring effect. The pigment zinc oxide has been generally known to improve the resistance of protective coatings to attack by microorganisms and has been extensively used for this purpose in conjunction with its pigmentary properties.

It has been found that a zinc oxide pigment having a halogen content of from about .10 to about 1.0 percent in the form of a zinc oxyhalide substantially improves the fungistatic properties of the coating and provides a very satisfactory protective coating.

The pigment zinc oxide is commercially manufactured usually by one of three methods; namely, the French process, the American process and by chemical precipitation. In the French process, the pigment is produced by vaporizing and burning zinc metal. In the American process, it is produced by smelting zinc ores or other zinc-bearing material with carbonaceous fuel. In the chemical precipitation method, it is produced by chemical precipitation of zinc carbonate or zinc hydrate from a zinc-bearing solution and thereafter calcining the precipitate to obtain zinc oxide.

Halogen may be incorporated with the zinc oxide as oxyhalide by treating a large excess of the zinc oxide with, for example, hydrogen chloride, chlorine, hydrochloric acid vapor, or the corresponding fluorine compounds in the flues during the production of the pigment by the American or French processes, or a large excess of the pigment may be sprayed or treated with hydrochloric or hydrofluoric acid mist or vapor after the pigment zinc oxide is collected.

Other procedures well known to the art may be employed to introduce the halogen into the zinc oxide structure to form basic zinc halides.

It has further been found that when a halide compound of zinc such as zinc oxychloride, oxyfluoride, oxybromide or oxyiodide is formed on pigment zinc oxide as hereinbefore mentioned, the pigment tends when freshly prepared to have an acid reaction as measured by titrating a water slurry of the coated pigment with standard alkali using phenolphthalein as an indicator. On aging the pigment gradually buffers this acidity and becomes substantially neutral. This property of the treated zinc oxide advantageously hardens the protective coating in which it is incorporated and favorably increases the fungistatic properties of the coating. As the pigmented coating weathers there is a slow release of zinc oxyhalide which assures protective action against the growth of microorganisms during the life of the coating composition.

A commercial grade of pigment zinc oxide in large excess containing 0.02 percent of chlorine may be treated with hydrochloric or hydrofluoric acid vapor in the flues of the smelting oven until the chlorine or fluorine content is about from .20 to .30 percent, or a raw or calcined grade of commercial zinc oxide in large excess is treated under agitation in a closed system with hydrogen chloride or hydrogen fluoride until the chlorine or fluorine content is about .20 to .30 percent. The incorporation of from about .10 to about 1.0 percent of chlorine and fluorine in the form of a zinc oxychloride and zinc oxyfluoride in a zinc oxide pigment also provides a very satisfactory protective coating.

Zinc oxide pigment produced in this manner and incorporated in various amounts in standard commercial paint vehicles substantially enhances the resistance of the paint films to attack by microorganisms in comparison with otherwise identical paint compositions containing untreated zinc oxide pigment. The inclusion in paint compositions of the zinc oxide pigment of the invention in an amount of about 10% of the total pigment is sufficient to provide a substantial enhancement of the fungistatic properties of the paint.

From the foregoing description it will be seen that the present invention provides pigments or extender pigments coated or treated to inhibit the development and growth of fungus, mildew and the like for use in the manufacture of protective coatings and the like having fungistatic properties, whereby the aims, objects and advantages of the invention are fully accomplished.

It will be evident that various modifications may be made in the form of the invention, for example other pigments such as white lead, titanium dioxide and lithopone or extender pigments such as talc or silica may be coated or treated with the fungus-resisting zinc oxyhalide of the invention.

This application is a continuation-in-part of my application Serial No. 180,909, filed August 22, 1950.

I claim:

1. A zinc oxide pigment having incorporated therein from about 0.1 to about 1.0 percent of a halogen in the form of a zinc oxyhalide.

2. A zinc oxide pigment as defined in claim 1 wherein the halogen is chlorine.

3. A zinc oxide pigment as defined in claim 1 wherein the halogen is fluorine.

4. A zinc oxide pigment as defined in claim 1 wherein the halogen is a mixture of chlorine and fluorine.

5. A composition for coating and the like comprising a vehicle and at least ten percent by weight of a fungistatic zinc oxide pigment having incorporated therein a zinc oxyhalide compound in amount equivalent to from about 0.1 to about 1.0 percent halogen content.

6. A composition as defined in claim 5 wherein the zinc oxyhalide is zinc oxychloride.

7. A composition as defined in claim 5 wherein the zinc oxyhalide is zinc oxyfluoride.

8. A composition as defined in claim 5 wherein the zinc oxyhalide is a mixture of zinc oxyfluoride and zinc oxychloride.

9. A method of making a fungistatic coating composition comprising adding to a vehicle or a pigmented composition at least ten percent by weight of a zinc oxide pigment having incorporated therein a zinc oxyhalide compound in amount equivalent to from about 0.1 to about 1.0 percent halogen content.

10. A method of making a fungistatic coating composition comprising adding to a vehicle or a pigmented composition at least ten percent by weight of a zinc oxide pigment having incorporated therein a zinc oxychloride compound in amount equivalent to from about 0.1 to about 1.0 percent chlorine content.

11. A method of making a fungistatic coating composition comprising adding to a vehicle or a pigmented composition at least ten percent by weight of a zinc oxide pigment having incorporated therein a zinc oxyfluoride compound in amount equivalent to from about 0.1 to about 1.0 percent fluorine content.

12. A method of making a fungistatic coating composition comprising adding to a vehicle or a pigmented composition at least ten percent by weight of a zinc oxide pigment having incorporated therein a mixture of zinc oxychloride and zinc oxyfluoride compound in amount equivalent to from about 0.1 to about 1.0 percent halogen content.

References Cited in the file of this patent

UNITED STATES PATENTS

| | | |
|---|---|---|
| 1,444,051 | Allison | Feb. 6, 1923 |
| 1,863,700 | Seguine et al. | June 21, 1932 |
| 1,982,604 | Barfuss | Nov. 27, 1934 |
| 2,310,128 | Smith | Feb. 2, 1943 |
| 2,322,105 | Arnold | June 15, 1943 |
| 2,325,359 | Arnold et al. | July 27, 1943 |

OTHER REFERENCES

Nelson, "A Dozen Uses for Zinc Oxide in Paint," Official Digest, May 1939, pages 159–164.

Gilman Dictionary of Chemical Equations, The Eclectic Publishers (1929) (p. 266 relied on).

Roscoe et al.: A Treatise on Chemistry, published by MacMillan (1913) (p. 656, lines 11–16 relied on).